(No Model.) 3 Sheets—Sheet 1
W. JOHNSON.
VARIABLE VALVE GEAR.
No. 264,301. Patented Sept. 12, 1882.
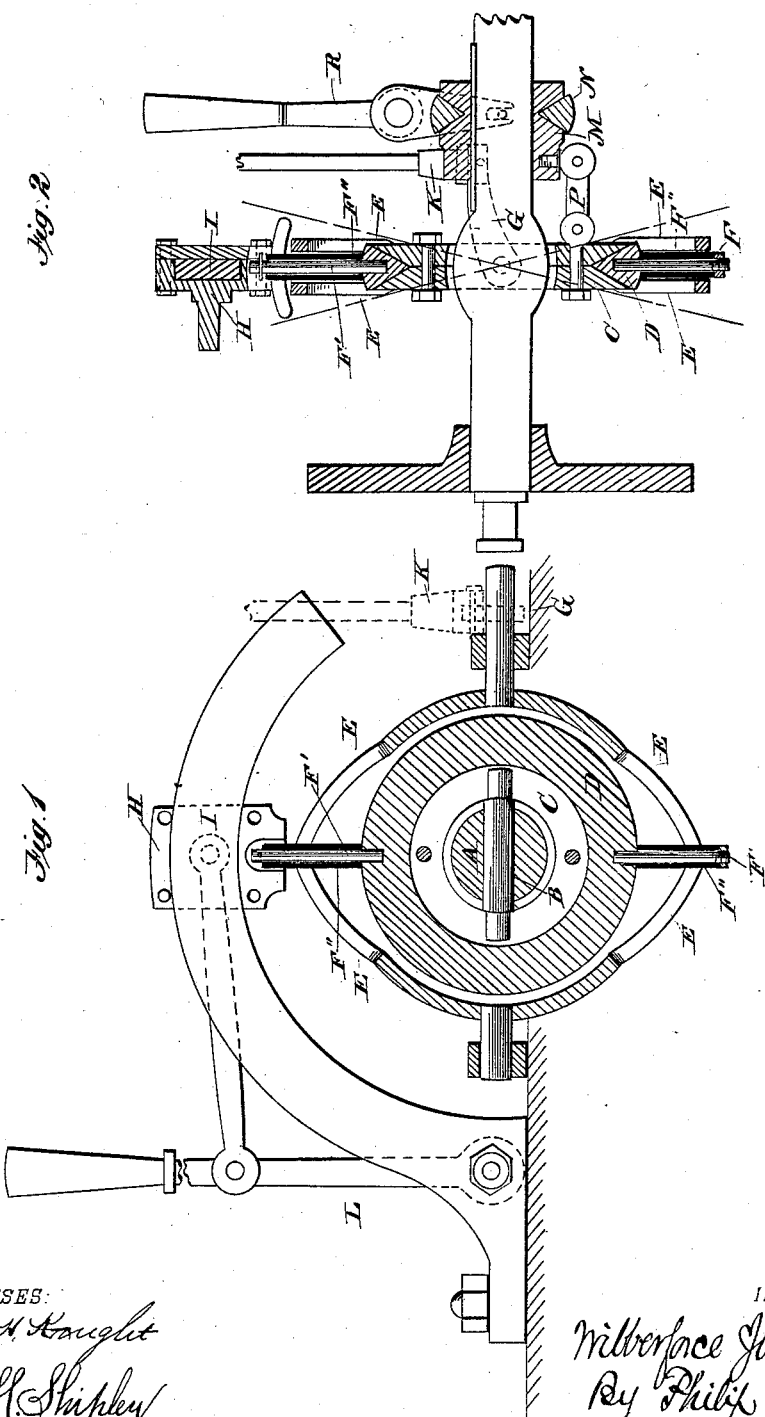
WITNESSES:
W. H. Knight
Wm H. Shipley
INVENTOR
Wilberforce Johnson
By Philip T. Dodge
Attorney (No Model.) 3 Sheets—Sheet 2.
W. JOHNSON.
VARIABLE VALVE GEAR.
No. 264,301. Patented Sept. 12, 1882.
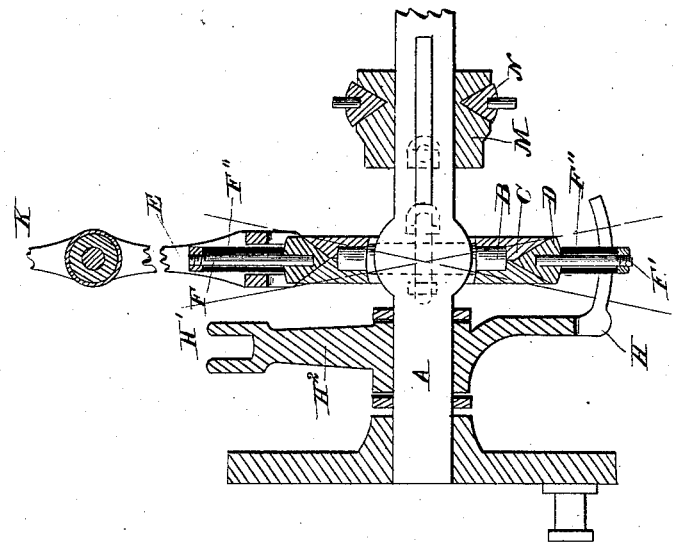
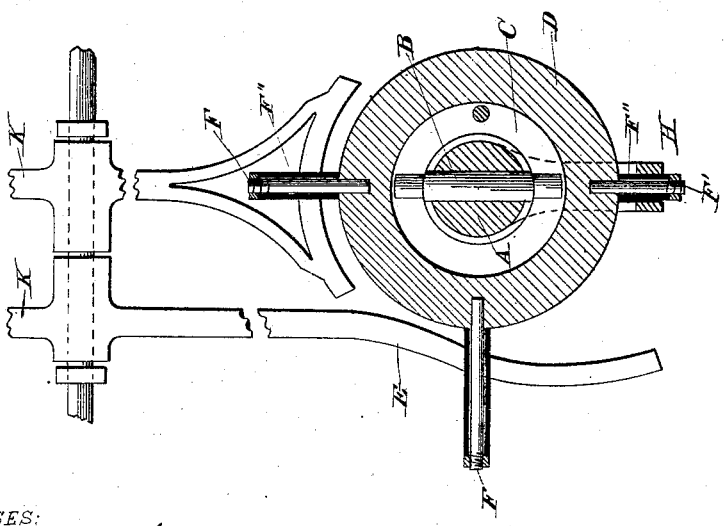
WITNESSES:
Wm. H. Knight
Wm. H. Shipley
INVENTOR:
Wilberforce Johnson
By Philip T. Dodge.
Attorney

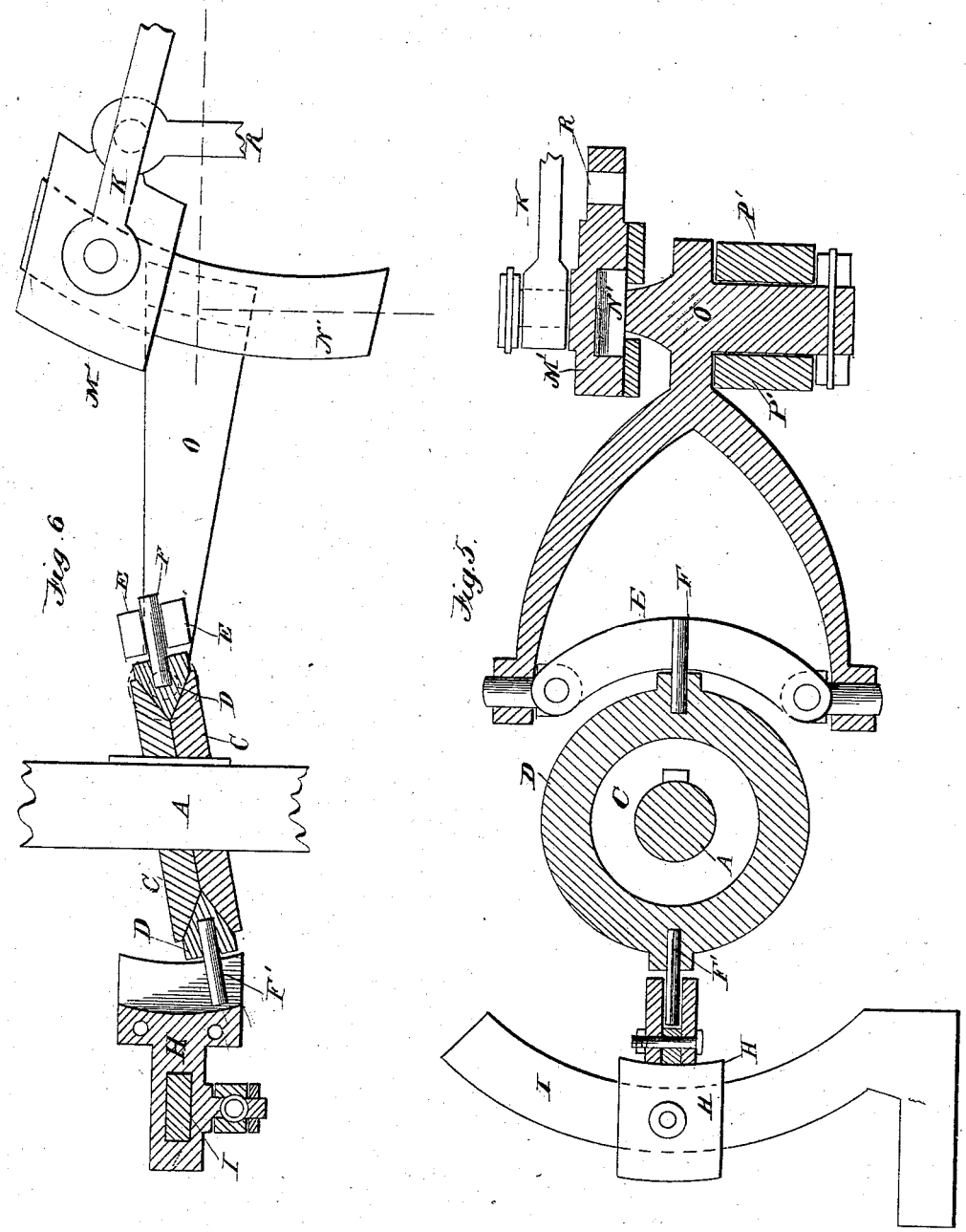

UNITED STATES PATENT OFFICE.

WILBERFORCE JOHNSON, OF LIVERPOOL, COUNTY OF LANCASTER, ENGLAND.

VARIABLE VALVE-GEAR.

SPECIFICATION forming part of Letters Patent No. 264,301, dated September 12, 1882.

Application filed March 20, 1882. (No model.) Patented in England March 23, 1881, No. 1,280.

*To all whom it may concern:*

Be it known that I, WILBERFORCE JOHNSON, of Liverpool, in the county of Lancaster, in the Kingdom of England, have invented a new and Improved Variable Valve-Gear, (for which I have received Letters Patent in England, No. 1,280, dated 23d March, 1881;) and I do hereby declare that the following is a full, clear, and exact description of the same, which will enable others skilled in the art to which it appertains to make and use the same.

This invention relates to improvements on the variable valve-gear for which I obtained Letters Patent on the 9th January, 1877, No. 186,135; and it consists, first, in swiveling a ring or its equivalent upon two points or pins (hereinafter called "shaft-pins") on opposite sides of a shaft, upon which another ring or its equivalent, armed with two projections or catches, (hereinafter called "ring-pins,") is free to slide, and by interlocking with its ring-pins into the valve cranks or links causes the valve-rods to travel; second, in so connecting one of the ring-pins or its equivalent with a reversing-screw or equivalent apparatus that by moving the reversing-handle the inner ring and the ring-pins aforesaid are made to stand at right angles to the shaft and parallel to a line joining the two points or pins aforesaid, or at an angle with that line on either side, and thus reverse or stop the valve-motion; and, third, in arranging a lead-motion by which the positions of the outer ring and ring-pins are caused to vary, and thus the amount of lead is changed.

Referring to the drawings, Figures 1 and 2 are transverse and longitudinal sections of variable valve-gear as applied to a single-acting reversible engine; Figs. 3 and 4, transverse and longitudinal sections of variable valve-gear as applied to a double-acting reversible engine; Figs. 5 and 6, transverse and longitudinal sections of variable valve-gear as applied to engines where the space of the main shaft is confined, and here the ring D is keyed to the shaft instead of swiveling thereon.

In these drawings like letters apply to like parts.

A is the main shaft; B, shaft-pin, on which the disk C is moved so as to produce the desired angle for working the valves; D, collar or strap in which pins F F' are inserted; E, link of valve-crank lever; G, valve-crank; K, valve-rod; H, guide; I, quadrant on which H slides, thus causing the collar D to change its position with the disk C, and thereby creating the desired amount of lead; L, handle for working guide H; M, sleeve connected with disk C by link P; R, cut-off and reversing lever; N, strap of sleeve M, carrying two pins which work into cranks of lever R in Figs. 5 and 6; N', quadrant or link connected to the link E and pivoted in P; M', slide-block moved to and fro on quadrant N' by handle R; O, quadrant-lever; P, bearing for lever O.

In carrying out my invention I prefer to fix a pin, B, forming the shaft-pins projecting on both sides at right angles right through the crank shaft or axle on the shaft A, with bearings on the shaft-pins B. A ring, C, made in two parts bolted together, is placed around the shaft, but with internal diameter larger than the diameter of the shaft A, so as to leave plenty of play. Sliding in a groove on the periphery of the ring C, I place a second ring, D, like the strap of an eccentric, and upon the periphery of this weld or otherwise fix two pins, F and F', in ordinary pairs of engines. The pin F' works into the lead-motion, (hereinafter described,) and each of them works into a slot of a link forming one arm of a bell-crank lever, E, each working the valve-rod of one of the two coupled engines. I sometimes use three separate pins, as shown in Fig. 3. Secured to each of the pins by a nut is a thimble, F", to facilitate their working.

The lead mechanism is a guide, H, or other apparatus linked to the handle L, working on one of the ring-pins F', a fulcrum or quadrant, I, and is so arranged that by moving the lever L or a screw the outer ring or strap, D, is caused to slide on the ring C, and the position of the outer and inner rings relatively to each other is changed. The best form of mechanism, perhaps, for this purpose is shown in Figs. 3 and 4, in which a bell-crank lever, H², is pivoted on the crank-shaft A or its bearing. The position of one arm H' of the bell-crank lever is regulated by a screw or handle, L, (not shown in Figs. 3 and 4,) while the other arm carries a fork or slotted link or guide, H, fitting round the aforesaid pin F'. By regulating the handle or equivalent screw the bell-crank lever or link H² moves with it, and with it moves the outer ring, D, on the inner, C, and consequently the ring-pin F; or I may adopt the plan shown in Fig. 1, where the guide H slides on a quadrant, I. The rings C and D are preferably made, the outer one, D, like an eccentric-strap with two or more pins, F and F', aforesaid, the inner one, C, formed of two rings bolted side to side and grasping the shaft-pins on the shaft between them. The inner ring has a connecting arm or link, P, to one side, at a point equidistant from the ends of the shaft-pins B, and connected to the reversing or cut-off lever by mechanism that will permit of the inner ring revolving with the shaft. One plan of doing this is to link the inner ring, C, near its periphery to a second ring or washer, M, sliding on key or feathers on the shaft A, which ring has a strap, N, round it linked to the reversing-lever, so that by moving the reversing-lever the ring C is drawn to one side, or rather turns on its pivot, (the shaft-pin B.)

In Figs. 5 and 6 the valve-rods K are actuated through a slide, M', which moves on a quadrant or link, N', pivoted in P', and swiveled to and fro by the motion caused by the angular position of the ring C on the shaft A as it rotates.

The mode of action is as follows: To cut off steam or reverse the engines shown in Figs. 1, 2, 3, and 4, the ring or washer M is moved on the crank-shaft by means of a handle, thus altering the angular position of the ring D and giving greater or less travel to the valves, or reversing the engine. The engine shown in Figs. 5 and 6 is reversed by moving the slide-block M' by means of the handle R along the quadrant N'. To alter the lead, the position of the strap or ring D on ring C is regulated by means of the guide H, which is actuated by a handle or screw.

I claim—

1. In combination with the longitudinally-reciprocating valve-rod, the operating-gear therefor, consisting of the disk revolving with the driving-shaft obliquely to its axis, combined with the non-rotating ring or strap encircling said disk, and an arm for reciprocating the valve-rod attached to and vibrated by means of the non-rotating ring, substantially as described and shown.

2. The rotary main shaft and the disk carried thereby, and adjustable as to its obliquity thereon, in combination with the external ring, D, and the external link or strap, E, the latter having at right angles to each other a pivotal support and a pivotal connection with the ring D, substantially as described and shown.

3. The pivoted ring C, made in two halves and bolted together, thus inclosing the ends of the pivots, in combination with the sliding ring D, fitting into the groove formed by the two halves of C, substantially as and for the purposes described.

4. The combination of the ring C, adjusted or adjustable so as to stand obliquely to the axis of the shaft, and the sliding ring D, carrying pins F, actuating the valve-gear, with the adjustable guide H, regulating the angle that the pins F shall make with the pivots B, for the purposes described.

5. The combination of the ring D, sliding on a path adjusted at or adjustable to an angle oblique to the shaft, with the pins F and slotted frame E, actuating the valve-gear, substantially as described.

6. The combination of the lever R, sliding ring N, sleeve M, and connecting device P with the pivoted disk C.

7. The combination of the lever R, the slide M', the quadrant or link N', the quadrant-lever O, and the link E with the disk C.

WILBERFORCE JOHNSON.

Witnesses:
I. O. O'BRIEN,
JOHN HAYES.